(12) United States Patent
Chang (10) Patent No.: US 8,248,771 B2
(45) Date of Patent: Aug. 21, 2012

(54) POWER SUPPLY OF PERSONAL COMPUTERS EQUIPPED WITH A MODULAR CONVERSION CIRCUIT

(75) Inventor: Hsiu-Cheng Chang, Taipei (TW)

(73) Assignee: Sea Sonic Electronics Co., Ltd., Taipei (TW)

(*) Notice: Subject to any disclaimer, the term of this patent is extended or adjusted under 35 U.S.C. 154(b) by 415 days.

(21) Appl. No.: 12/689,622

(22) Filed: Jan. 19, 2010

(65) Prior Publication Data
US 2010/0177472 A1 Jul. 15, 2010

Related U.S. Application Data

(63) Continuation-in-part of application No. 12/354,377, filed on Jan. 15, 2009, now Pat. No. 8,040,686.

(51) Int. Cl.
*H01R 12/00* (2006.01)
(52) U.S. Cl. .......... 361/679.02; 361/600; 361/601; 361/792; 361/796; 363/59; 363/141; 363/146; 307/11; 307/31; 307/43; 307/46
(58) Field of Classification Search .......... 361/600, 361/601, 679.01, 679.02, 719–724, 785, 361/792–797, 730, 736, 748, 752, 747; 363/49, 363/59, 21.05, 21.09, 21.04, 21.07, 21.12, 363/16–20, 15, 97, 131, 141, 146, 56.1, 92; 323/222, 225, 267, 282–285, 268, 269, 271, 323/272, 351, 371; 307/11, 15, 31, 43, 46, 307/58, 32, 34, 37, 39, 38, 42, 126; 315/308, 315/291, 307; 439/66, 188, 76.1, 532–535, 439/527, 540.1, 218, 222, 529, 530, 502–505; 174/50, 50.52, 250; 710/100–104, 126–129, 710/260, 2, 8, 10
See application file for complete search history.

(56) References Cited

U.S. PATENT DOCUMENTS

| | | | |
|---|---|---|---|
| 6,129,598 A * | 10/2000 | Yu et al. | 439/883 |
| 6,459,175 B1 * | 10/2002 | Potega | 307/149 |
| 7,043,648 B2 * | 5/2006 | Tokunaga | 713/320 |
| 7,177,131 B2 * | 2/2007 | Chen et al. | 361/93.9 |
| 7,187,544 B2 * | 3/2007 | Tsai | 307/43 |
| 7,313,000 B2 * | 12/2007 | Fiorentino et al. | 361/752 |
| 7,364,459 B2 * | 4/2008 | Tsai | 439/554 |
| 7,629,712 B2 * | 12/2009 | Nakashima et al. | 307/126 |

(Continued)

FOREIGN PATENT DOCUMENTS
TW 200928707 7/2009

*Primary Examiner* — Michail V Datskovskiy
(74) *Attorney, Agent, or Firm* — Muncy, Geissler, Olds & Lowe, PLLC (57) ABSTRACT

A power supply of personal computers equipped with a modular conversion circuit comprises a main circuit board, a conversion module board, a first conversion circuit and a first module slot located on the main circuit board, and a second conversion circuit and a second module slot located on the conversion module board. The first conversion circuit converts an input power to generate at least one output power. The first module slot outputs the output power. The second conversion circuit converts the output power and generates at least one conversion power. The second module slot outputs the conversion power to allow at least one external element to respectively electrically connect to the first module slot and the second module slot according to power requirement.

14 Claims, 6 Drawing Sheets

U.S. PATENT DOCUMENTS

| | | | |
|---|---|---|---|
| 7,901,242 B2 * | 3/2011 | Chen | 439/502 |
| 2004/0119339 A1 * | 6/2004 | Sytwu | 307/28 |
| 2004/0201279 A1 * | 10/2004 | Templeton | 307/11 |
| 2010/0109436 A1 * | 5/2010 | Lanni | 307/31 |
| 2011/0291477 A1 * | 12/2011 | Chen et al. | 307/31 |

* cited by examiner

POWER SUPPLY OF PERSONAL COMPUTERS EQUIPPED WITH A MODULAR CONVERSION CIRCUIT

CROSS REFERENCE TO RELATED APPLICATIONS

This application is a Continuation-in-Part of application Ser. No. 12/354,377, filed on Jan. 15. 2009 now U.S. Pat. No. 8,040,686, and for which priority is claimed under 35 U.S.C. §120, the entire contents of which are hereby incorporated by reference.

FIELD OF THE INVENTION

The present invention relates to a power supply of personal computers equipped with a modular conversion circuit and particularly to a power supply capable of providing multiple voltage outputs and containing a novel conversion circuit layout structure.

BACKGROUND OF THE INVENTION

Power supply equipped with multiple output voltages is a technique well developed now. With loads and electricity required gradually, output power by the power supply also has to be increased constantly. These days, many countries and energy organizations around the world have set up many energy policies, this makes improvement of power supply conversion efficiency an urgent issue. And reducing circuit loss of the power supply is also an important factor to address this issue. A conventional power supply, such as R.O.C. publication No. 200928707 entitled "Power supply equipped with a DC-DC converter modular structure" discloses a power supply (100) capable of supplying multiple voltage outputs (referring to its FIG. 1). It contains a conversion circuit on a circuit board (110). The circuit board (110) has a transformer (111) and other circuit elements located thereon to transform input power to multiple output powers at 12V, 5V and 3.3V. The output powers of varying voltages are linked to a module back panel (117) through a plurality of conducting wires (113A, 113B, 114A, 114B, 115A, 115B, 116A and 116B). The module back panel has a plurality of slots to couple with external conducting wires to connect to the power supply to get the multiple output powers. However, a new technique has been developed now that provides multiple windings on a transformer to supply multiple outputs of varying voltages at lower conversion efficiency. But such an approach has a drawback, namely when one set of output voltage is short circuit, other sets of output lines could be affected.

To improve the conversion efficiency of outputting multiple voltages, the aforesaid R.O.C. publication No. 200928707 discloses another type of circuit (as shown in its FIG. 2). It mainly includes a circuit board (210) to provide output power of 12V. The output power of 12V is sent to a DC-DC converter (213) to be converted to output power of 5V and 3.3V. Finally, the circuit board (210) and the DC-DC converter (213) output the aforesaid power through a module back panel (217). The second conventional circuit previously discussed provides improved conversion efficiency for conversion of 5V and 3.3V, and the output circuits of 12V and other output circuits of aforesaid lower voltages can independently execute short circuit or abnormal protection. However, connection of 12V output power to the module back panel (217) and DC-DC converter (213), and output power of 5V and 3.3V requires individual wire sets. Power loss on the wires is higher and more waste heat is generated.

SUMMARY OF THE INVENTION

In view of the energy-saving standards of power supply circuits among various countries have been updated and raised higher constantly, the primary object of the present invention is to improve conversion circuit to achieve higher conversion efficiency and reduce loss on wires.

The present invention aims to provide a power supply of personal computers equipped with a modular conversion circuit. The power supply comprises a main circuit board and a conversion module board electrically connected to the main circuit board. The power supply further includes a first conversion circuit and a first module slot located on the main circuit board, and a second conversion circuit and a second module slot located on the conversion module board. The first conversion circuit receives an input power and converts the input power to generate an output power. The first module slot contains a plurality of first terminals and a plurality of first insertion ports. The first terminals are electrically connected to the main circuit board to transmit the output power to the first insertion ports of the first module slot. The second module slot on the conversion module board also has a plurality of second terminals and a plurality of second insertion ports. The second conversion circuit converts the output power to generate at least one conversion power at a potential different from the output power. The second module slot is electrically connected to the second conversion circuit to transmit the conversion power to the second insertion ports, thereby at least one external element can be electrically connected to the first module slot and the second module slot according to power required.

By means of the circuit structure set forth above, the independent conversion module board can convert the conversion power and output directly through the second insertion ports. Thus the wires that cause loss can be omitted and higher conversion efficiency can be achieved to reduce the loss.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
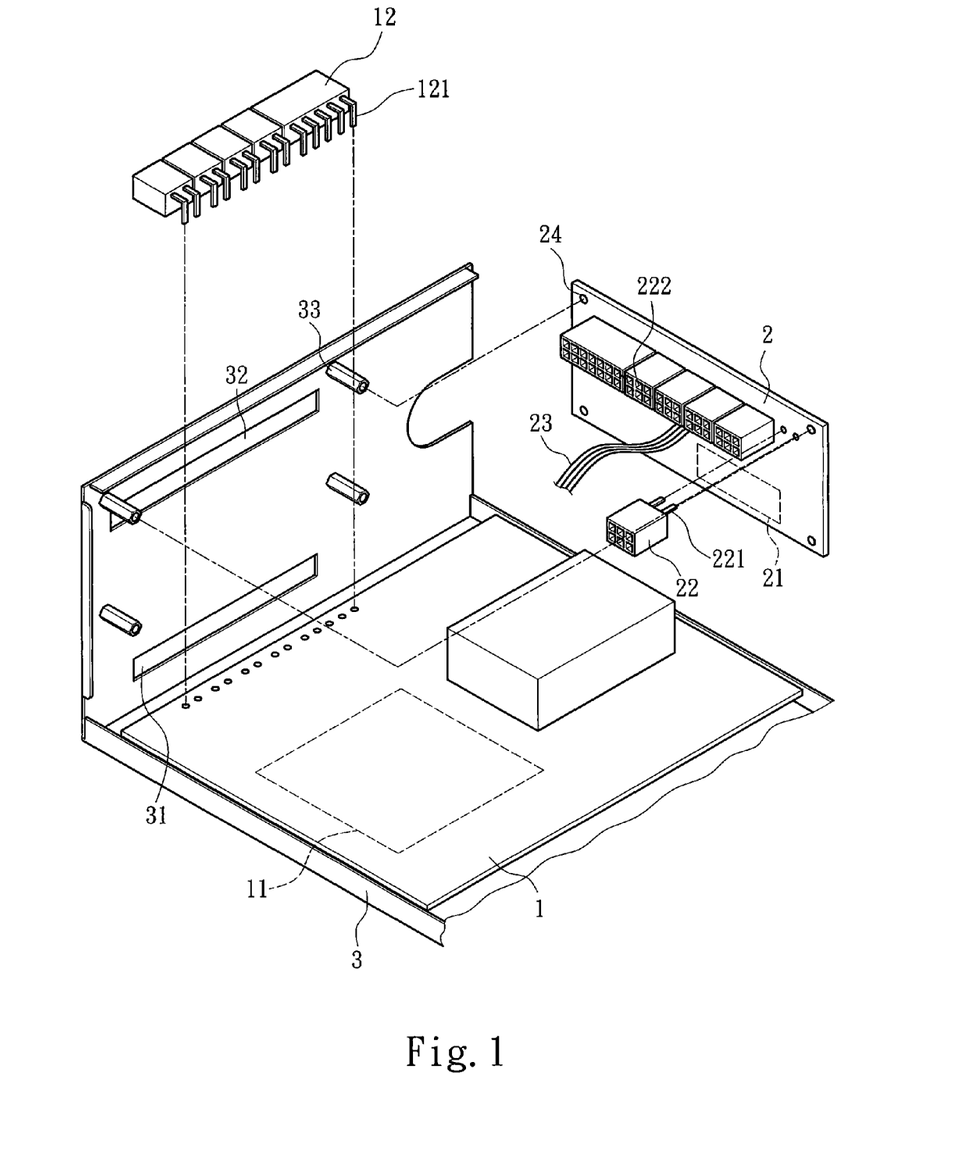
FIG. 1 is schematic view-1 of power supply structure of the present invention.
Figure 2:
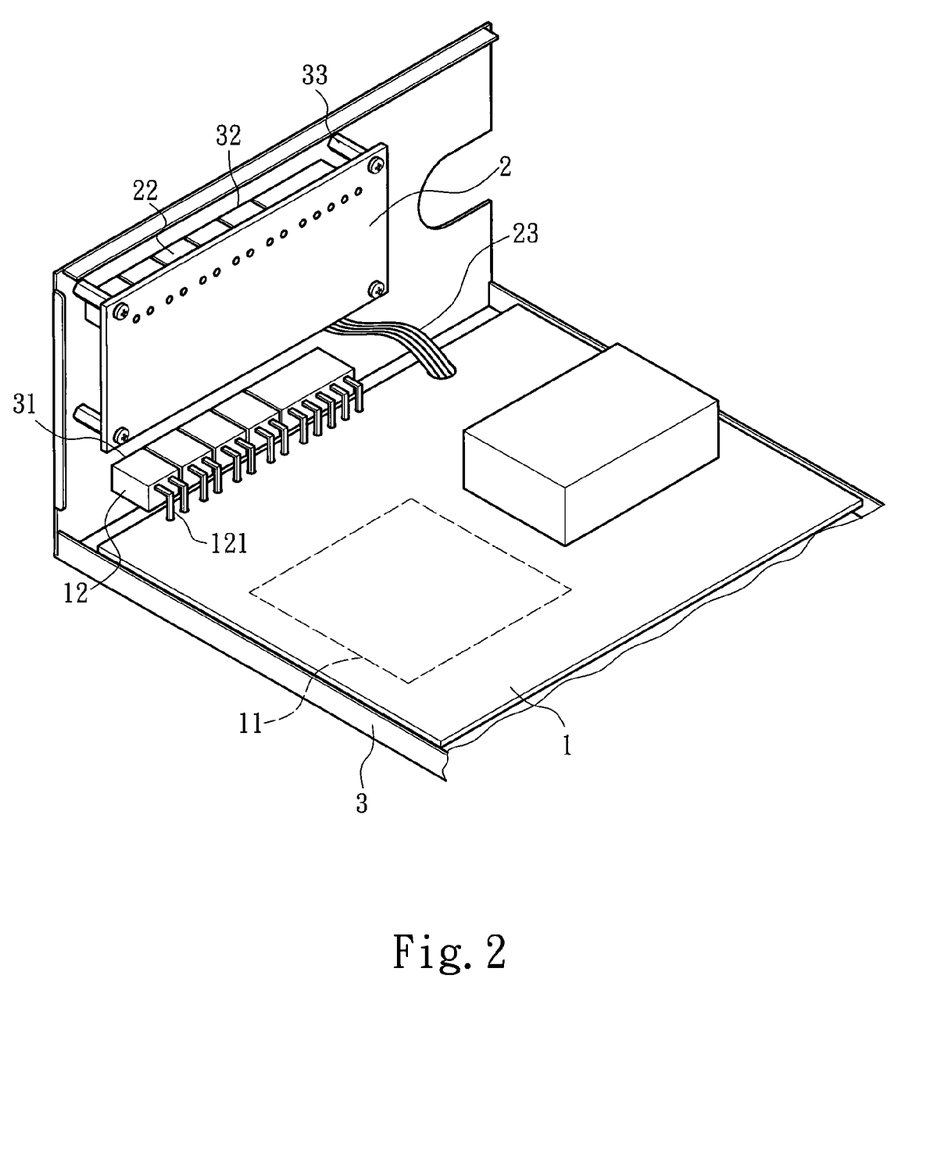
FIG. 2 is schematic view-2 of power supply structure of the present invention.
Figure 3:
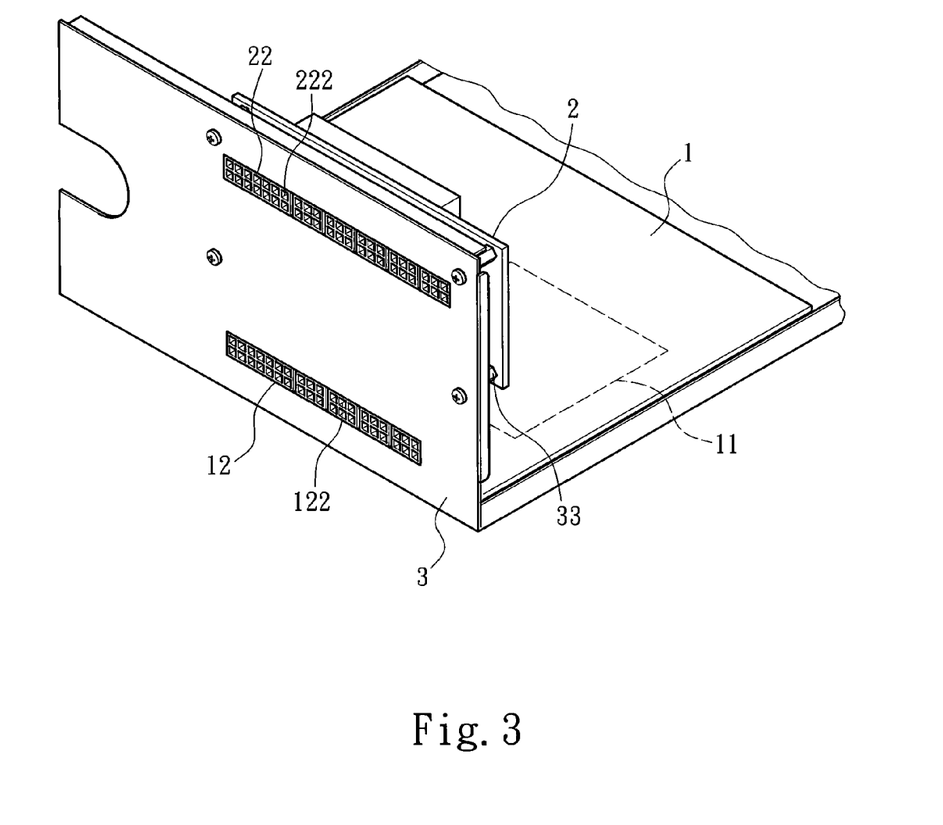
FIG. 3 is schematic view-3 of power supply structure of the present invention.
Figure 4:
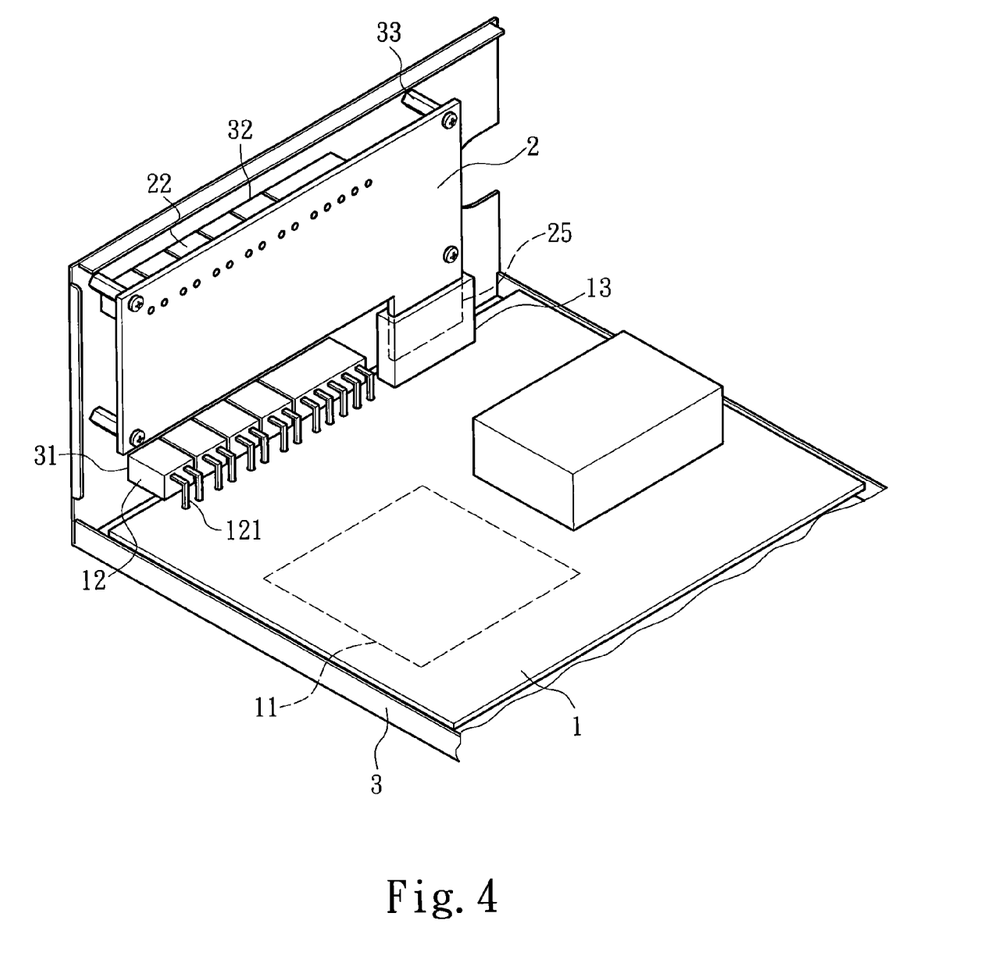
FIG. 4 is a schematic view of another embodiment of the power supply of the present invention.

The present invention provides a power supply of personal computers equipped with a modular conversion circuit. Referring to FIG. 1, the power supply comprises a main circuit board 1, a conversion module board 2 electrically connected to the main circuit board 1 and a housing 3 to accommodate the main circuit board 1 and the conversion module board 2. The housing 3 has a power socket to connect to a power source. The main circuit board 1 has a first conversion circuit 11 located thereon to receive an input power from the power source and convert the input power to generate at least one output power, and a first module slot 12 containing a plurality of first terminals 121 to electrically connect to the main circuit board 1. The first module slot 12 further contains a plurality of first insertion ports 122. The first terminals 121 transmit output power from the main circuit board 1 to the first insertion ports 122. The housing 3 has a first slot opening 31 located where the first module slot 12 is positioned so that when the main circuit board 1 is mounted onto the housing 3, electric connection can be established between the main circuit board 1 and the first module slot 12, and through the first slot opening 31 openings of the first insertion ports 122 can be exposed outside the housing 3 to electrically connect to at least one external element to deliver the output power. The first conversion circuit 11 is a switch type conversion circuit which contains at least one filter, a transformer and a switch set. AC input power is converted through the first conversion circuit 11 to become DC output power. The principle and technique of the switch type conversion circuit are known in the art, thus details are omitted herein. The first conversion circuit 11 merely executes power conversion of the input power to the output power, hence element parameters of the first conversion circuit 11 can be optimized according to the targeted voltage of the output power to reach optimal conversion efficiency. Since large scale electronic elements such as transformer are mounted onto the main circuit board 1, the output power can be set to DC power with a desired current at a higher voltage of 12V. The conversion module board 2 has a second conversion circuit 21 located thereon to receive the output power and convert the output power to generate at least one conversion power at a potential different from the output power. The second conversion circuit 21 also can be made to selectively regulate the output power to generate a plurality of conversion powers at varying potentials. The conversion module board 2 has a second module slot 22 located thereon. The second module slot 22 contains a plurality of second insertion ports 222 and a plurality of second terminals 221 electrically connected to the second conversion circuit 21. The second module slot 22 is connected to the second conversion circuit 21 through the second terminals 221 to transmit the conversion power to the second insertion ports 222. In the event that the second conversion circuit 21 regulates and outputs a plurality of conversion powers, each conversion power of a different voltage is output through at least one second insertion ports 222. The multiple conversion powers previously discussed include at least one conversion power lower than the output power, or at least one conversion power higher than the output power. The housing 3 also has a second slot opening 32 to expose openings of the second insertion ports 222 outside the housing 3 when the conversion module board 2 is mounted to allow at least one external element to electrically connect to the first module slot 12 and the second module slot 22 according to power required to get the output power and conversion power. In a preferred embodiment, the conversion module board 2 and the main circuit board 1 are two independent and separated circuit boards. The housing 3 has a plurality of positioning structures to couple with the conversion module board 2 so that the conversion module board 2 can be independently mounted on the housing 3. FIG. 2 illustrates one embodiment in which the positioning structures are a plurality of fastening struts 33, and the conversion module board 2 has fastening holes 24 run through by the fastening struts 33 to fasten the conversion module board 2 on the housing 3. Another option is to have the main circuit board 1 and the conversion module board 2 electrically connected through a wire set 23 to transmit the output power to the conversion module board 2 (referring to FIGS. 1 and 2). However, the main circuit board 1 and the conversion module board 2 may also be coupled as shown in FIG. 4, in which the main circuit board 1 has an output slot 13, and the conversion module board 2 has a power connection end 25 inserting into the output slot 13 to get the output power. The conversion power generated by the conversion module board 2 previously discussed can be DC power at 5V and 3.3V, or 24V, −12V. −5V, −3.3V. As the conversion power generated by the conversion module board 2 is different from the output power, the output power generated by the main circuit board 1 can be selected to transmit a greater portion of energy. Since the conversion module board 2 gets the output power and converts to the conversion power with other varying potentials, minimum transmission wires can be used to reduce loss, and the element parameters of the conversion module board 2 also can be optimized. The output power and conversion power are linked respectively through the first module slot 12 and second module slot 22 via different slot openings 31 and 32 (referring to FIG. 3) to external electric devices (such as optical disk drives, hard disk drives and the like) or computers.

Figure 5:
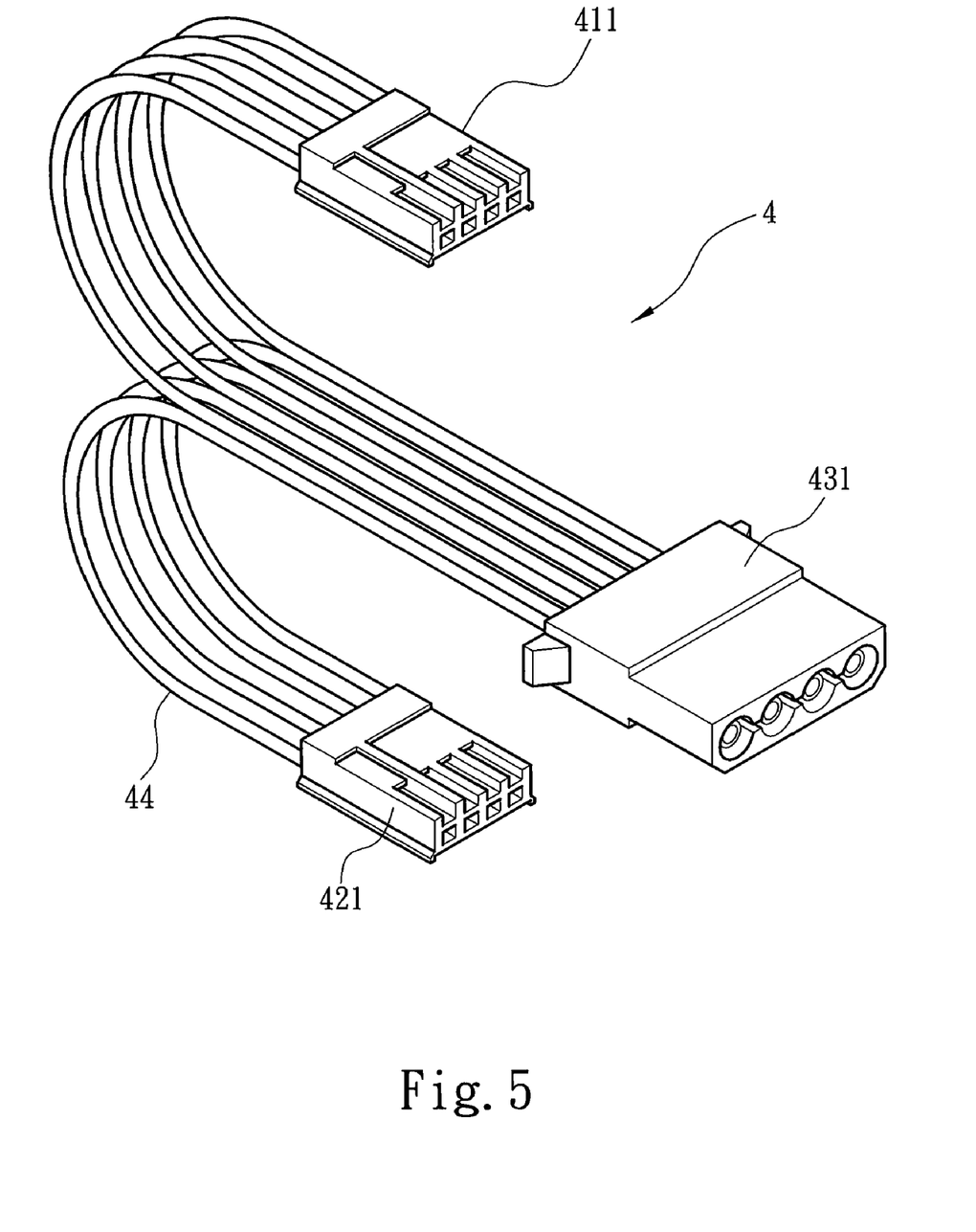
FIG. 5 is a perspective view of an output wire set mating the power supply of the present invention.
Figure 6:
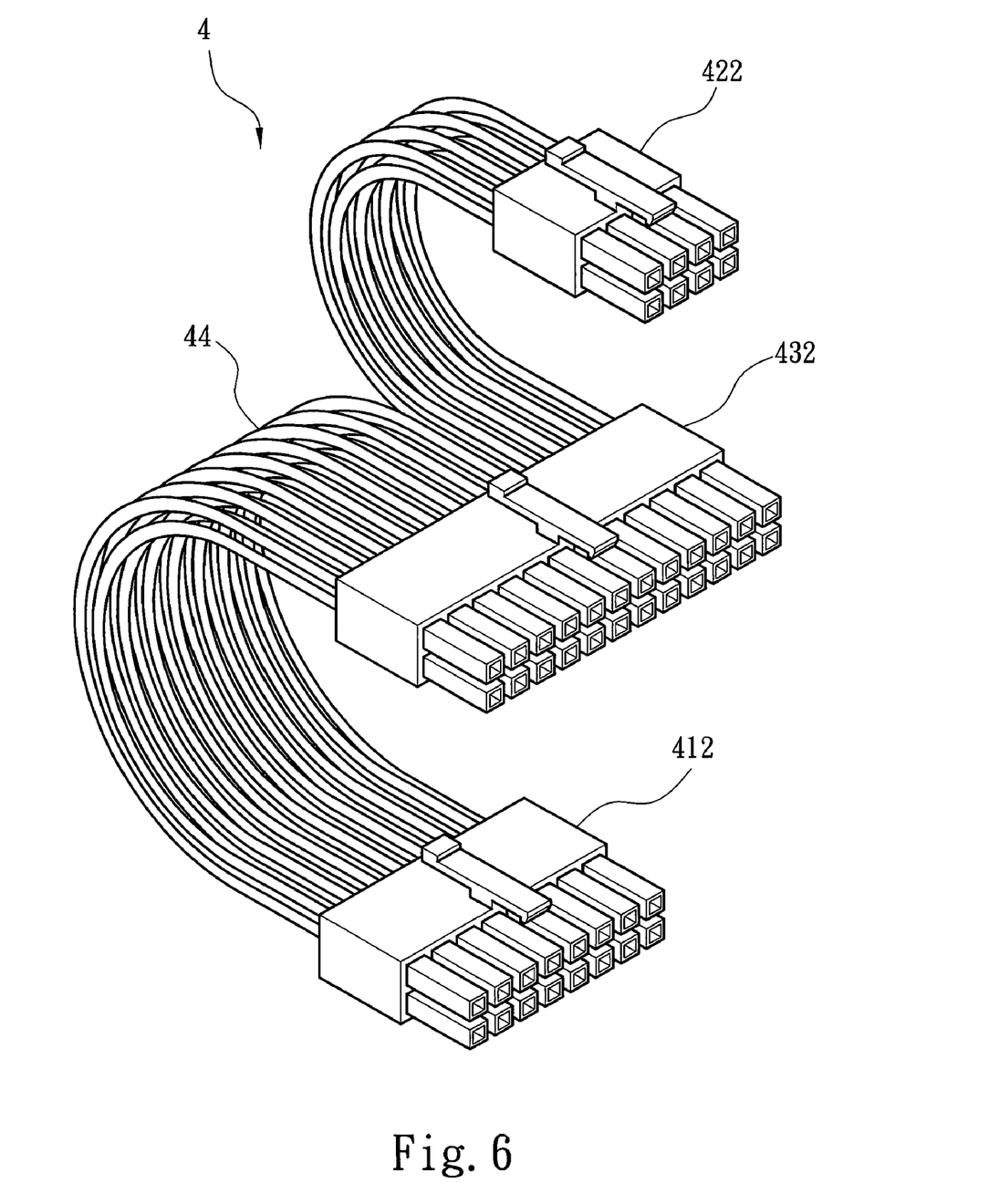
FIG. 6 is a perspective view of another output wire set mating the power supply of the present invention.

The power supply previously discussed further includes an output wire set 4 (as shown in FIGS. 5 and 6). Also referring to FIG. 4, the output wire set 4 comprises a first plug 411, a second plug 421 and a third plug 431. The third plug 431 has one end connected to at least one power cord 44 which has another end electrically connected to the first plug 411 and second plug 421. The output wire set 4 can integrate outputs of the first module slot 12 and second module slot 22. FIG. 5 illustrates an embodiment in which includes the first plug 411, second plug 421 and third plug 431 of different transmission specifications. FIG. 6 shows another embodiment in which another set of a first plug 412, second plug 422 and third plug 432 of the same transmission specification is provided. The first plug 412, second plug 422 and third plug 432 may have varying number of insertion ports. The first plugs 411 and 412 are electrically connected to the first module slot 12, and the second plugs 421 and 422 are electrically connected to the second module slot 22, and the power cord 44 connected to the first plugs 411 and 412 and the second plugs 421 and 422 is converged in a staggered manner on the third plugs 431 and 432 to provide combination of the output power and multiple conversion powers. By means of the power supply structure set forth above, higher conversion efficiency and lower loss can be achieved. The output wire set 4 also can be formed in a flexible combination to deliver the output power and conversion power at multiple varying voltages to drive loads. Thus the present invention provides a significant improvement over the conventional techniques.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:
1. A power supply of personal computers equipped with a modular conversion circuit, comprising:
   a main circuit board;
   a conversion module board electrically connected to the main circuit board;

a first conversion circuit located on the main circuit board to receive an input power and convert the input power to generate at least one output power;

a first module slot including a plurality of first terminals and a plurality of first insertion ports, the first terminals being electrically connected to the main circuit board to transmit the output power to the first insertion ports;

a second conversion circuit located on the conversion module board to convert the output power and generate at least one conversion power at a potential different from the output power; and a second module slot including a plurality of second terminals and a plurality of second insertion ports, the second module slot being electrically connected to the second conversion circuit through the second terminals to transmit the conversion power to the second insertion ports to allow at least one external element to respectively electrically connect to the first module slot and the second module slot according to power requirement.

2. The power supply of personal computers equipped with a modular conversion circuit of claim 1 further including a housing to accommodate the main circuit board and the conversion module board, the housing including two slot openings respectively run through by the first module slot and the second module slot to expose openings of the first and second insertion ports outside the housing.

3. The power supply of personal computers equipped with a modular conversion circuit of claim 2, wherein the housing includes a plurality of positioning structures to connect to the conversion module board independently on the housing.

4. The power supply of personal computers equipped with a modular conversion circuit of claim 3, wherein the positioning structures are multiple fastening struts and the conversion module board includes fastening holes run through by the fastening struts.

5. The power supply of personal computers equipped with a modular conversion circuit of claim 1, wherein the main circuit board and the conversion module board are electrically connected to a wire set to transmit the output power to the conversion module board.

6. The power supply of personal computers equipped with a modular conversion circuit of claim 1, wherein the main circuit board includes an output slot and the conversion module board includes a power connection end inserting into the output slot to get the output power.

7. The power supply of personal computers equipped with a modular conversion circuit of claim 1, wherein the second conversion circuit generates a plurality of conversion powers of varying potentials that are output respectively through at least one second insertion port of the second module slot.

8. The power supply of personal computers equipped with a modular conversion circuit of claim 7, wherein the conversion powers include at least one conversion power at a potential higher than the output power.

9. The power supply of personal computers equipped with a modular conversion circuit of claim 7, wherein the conversion powers include at least one conversion power at a potential lower than the output power.

10. The power supply of personal computers equipped with a modular conversion circuit of claim 7, wherein the first conversion circuit is a switch type conversion circuit which receives AC input power and includes at least one filter, a transformer and a switch set.

11. The power supply of personal computers equipped with a modular conversion circuit of claim 7 further comprising an output wire set which includes a first plug, a second plug and a third plug, the third plug including one end connected to at least one power cord which includes another end linked to the first plug and the second plug.

12. The power supply of personal computers equipped with a modular conversion circuit of claim 11, wherein the first plug is electrically connected to the first module slot, the second plug being electrically connected to the second module slot, the third plug providing combination of the output power and the conversion powers.

13. The power supply of personal computers equipped with a modular conversion circuit of claim 12, wherein the third plug is formed at a specification different from that of the first plug and the second plug.

14. The power supply of personal computers equipped with a modular conversion circuit of claim 1, wherein the output power and the conversion power are DC power.

\* \* \* \* \*